United States Patent [19]

Divjak, Jr. et al.

[11] Patent Number: 4,578,798

[45] Date of Patent: Mar. 25, 1986

[54] METHOD FOR COMMUNICATING BINARY DATA USING MODIFIED FREQUENCY SHIFT KEYING TECHNIQUES

[75] Inventors: August A. Divjak, Jr., Waukesha; Thomas C. Holdorf, Milwaukee, both of Wis.

[73] Assignee: Johnson Service Company, Milwaukee, Wis.

[21] Appl. No.: 589,764

[22] Filed: Mar. 15, 1984

[51] Int. Cl.$^4$ .................. H04L 27/10; H03C 3/00
[52] U.S. Cl. .......................... 375/45; 375/62
[58] Field of Search .............. 375/45, 46, 47, 48, 375/49, 88, 89, 90, 62; 332/16 R; 329/104; 340/825.58

[56] References Cited

U.S. PATENT DOCUMENTS

| | | | |
|---|---|---|---|
| 3,665,103 | 5/1972 | Watkins | 375/49 |
| 4,287,596 | 9/1981 | Chari | 375/88 |
| 4,414,675 | 11/1983 | Comroe | 375/45 |
| 4,435,824 | 3/1984 | Dellande et al. | 375/48 |
| 4,498,198 | 2/1985 | Buzard et al. | 375/88 |

*Primary Examiner*—Robert L. Griffin
*Assistant Examiner*—Stephen Chin
*Attorney, Agent, or Firm*—Larry L. Shupe; Joseph J. Jochman; John Phillip Ryan

[57] ABSTRACT

A method for communicating binary data using modified frequency shift keying techniques generally includes the steps of selecting a first bit count representative of a first untranslated frequency denoting a data signal at a first logic state, selecting a second bit count representative of a second untranslated frequency denoting a data signal at a second logic state and computing a mean bit count intermediate the first and second bit counts.

A signal is detected which has a first component at a first translated frequency and a second component at a second translated frequency and defines a first interval of time having boundaries identifiable as T0 and T1, a second interval of time having boundaries identifiable as T1 and T2, a third interval of time having boundaries identifiable as T2 and T3 and a fourth interval of time having boundaries identifiable as T3 and T4. A base bit count is generated which is representative of the sum of said second and third time intervals and the first component is decoded as a data signal at said first logic state if the base bit count is equal to or greater than the mean bit count. If the base bit count is less than the mean bit count, other bit counts are generated and a bit clock initiation time is selected as that time identifiable as T1 if the base bit count is equal to or less than a fore bit count. Other times may be selected as the bit clock initiation time, depending upon the outcome of disclosed bit count comparisons.

2 Claims, 11 Drawing Figures

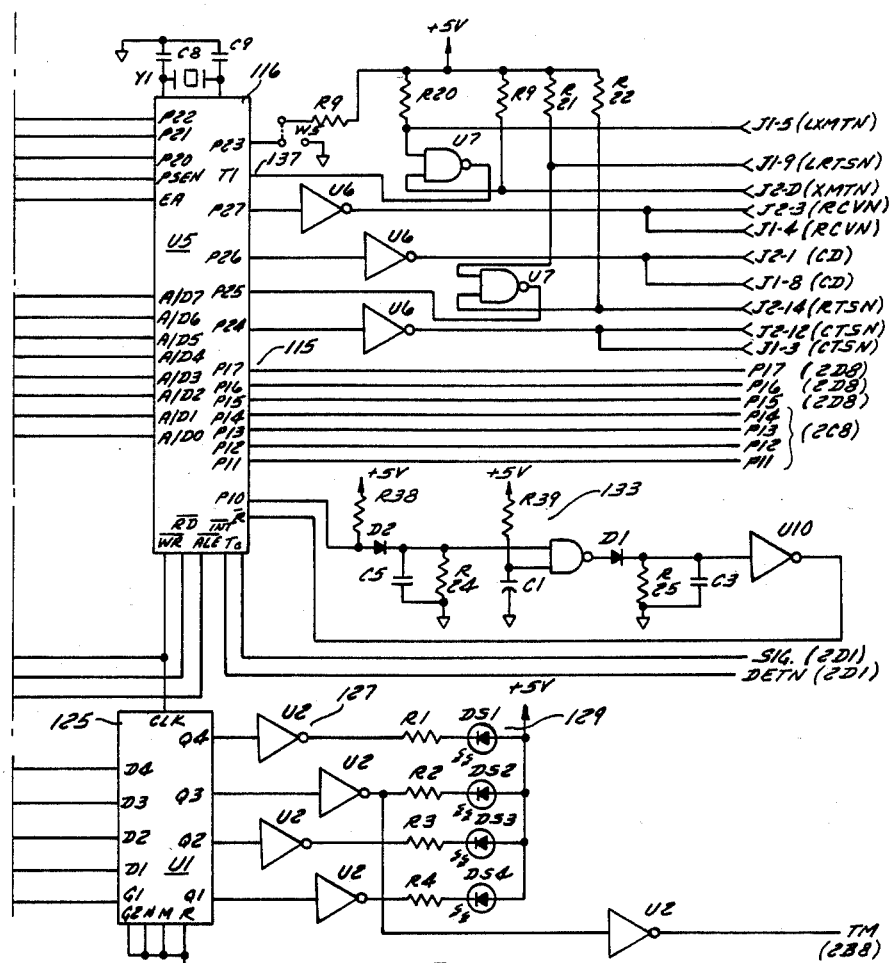
FIG. 7B
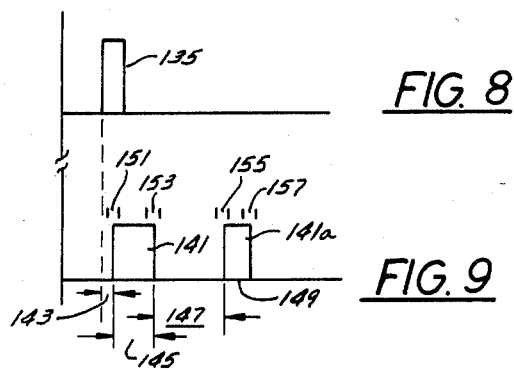
FIG. 8
FIG. 9

METHOD FOR COMMUNICATING BINARY DATA USING MODIFIED FREQUENCY SHIFT KEYING TECHNIQUES

This invention relates to a method for communicating binary data and more particularly, to a method for communicating data along telephone lines using modified frequency shift keying (FSK) techniques and where the data stream is interpreted to provide its own clocking signal.

The transmission of data communications along coaxial cables dedicated to the purpose is known and widely used. More recently, telephone networks have been employed as the communication link between local and remote digital devices. Among the examples of installations of this type are building automation systems (BAS) adapted for heating, ventilating and air conditioning (HVAC) control and for energy management within a large complex of buildings. Typically, the HVAC equipment such as heating units, air conditioning chiller coils, humidifiers and the like are controlled from a remote, computerized central console. These equipments have electronic field processing units mounted adjacent thereto, the processing units being adapted to receive digitally coded command signals from the central computer and to transmit response signals back to the computer. Since the field processing units and the central computer are usually widely separated, the telephone network is well adapted for providing a communication link therebetween. This network may be comprised of copper wiring as a twisted pair or, more typically, as a combination of wiring and microwave links.

The telephone network has been optimized for voice transmissions, i.e., for voice signals which are of the analog type in that they are continuous and wave-like. On the other hand, data signals are digital in nature; that is, they are discrete signals characterized by signals representing two states, typically logic "1" and logic "0". Since the telephone network is used primarily for the transmission of analog signals, modems (modulator/demodulators) are needed to convert between digital data signals and analog signals.

One known method for communicating data by a modem uses phase shift keying (PSK) techniques wherein the times of occurrence of each bit time are precisely determined and the polarity of the signal is measured just prior and just subsequent to the occurrence of a bit time. Depending upon these polarities, the transmitted signal is interpreted to be a a particular pair of logic data signals. An impediment to this approach is that the propagation time and the signal amplitude may vary, causing the system to detect polarities at the incorrect point of the wave form. Further, the transmitting and receiving units must be precisely clocked together and it is typical to generate clocking signals for continuously resetting or recalibrating the digital clock of the receiving unit.

Yet another method for communicating data is to employ conventional frequency shift keying (FSK) techniques wherein the bit times are equal one to the other and a phase lock circuit is used to measure the frequency of a signal being transmitted during a particular bit time. To assure that the frequency measured is not that of a harmonic, it is required that at least one cycle of a signal be transmitted at a particular frequency and the maximum practical rate of transmission of data bits is about 1200 baud. Methods of this type also require precise control of bit times and precise clocking between the transmitting and the receiving stations.

Yet another method of data communication uses Manchester signal encoding wherein the bit times are precisely controlled and the signal is interpreted as a logic "1" or a logic "0", depending upon whether the digital signal is positive-going or negative-going at the midpoint of the bit time. Methods employing Manchester encoding require careful control over line harmonics and wave shape. Additionally, they require substantial bandwidths and, most significantly, they are sensitive to distortion.

While these known methods of communicating digital data signals via telephone networks have heretofore been satisfactory, they have failed to appreciate the manner in which such data communication may be accomplished using a modified FSK technique wherein the method is adapted for interpreting the data stream comprising the received signals which have undergone frequency translation, the interpretation being in a manner such that the data stream provides its own clocking signal.

SUMMARY OF THE INVENTION

In general, a method for communicating binary data includes the steps of selecting first and second bit counts which are respectively representative of first and second untranslated frequencies, the frequencies respectively denoting a data signal at a first logic state and a second logic state. A mean bit count is computed which is intermediate the first bit count and the second bit count. A signal is then detected which has first and second components at, respectively, first and second translated frequencies. This signal defines first, second, third and fourth intervals of time having boundaries which are respectively identifiable as T0 and T1; T1 and T2; T2 and T3 and T3 and T4. A base bit count is then generated which represents the sum of the second and third time intervals and the first component is decoded as a data signal at the first logic state if the base bit count is equal to or greater than the mean bit count. Thereupon, a fore bit count is generated which represents the sum of the first and second time intervals and an aft bit count is generated which represents the sum of the third and fourth time intervals. The base bit count is then compared with the fore bit count and a bit clock initiation time is selected as that time identifiable as T1 if the base bit count is equal to or less than the fore bit count. Other bit clock initiation times are selected, depending upon the results of comparison of the base bit count with other bit counts as disclosed. The inventive method is particularly useful with telephone lines meeting Bell System 3002 specification for unconditioned lines and employing L-carrier microwave links.

It is an object of the invention to provide a method for transmitting binary data which employs modified frequency shift key techniques.

Another object of the present invention is to provide a method for transmitting binary data upon telephone lines.

Still another object of the present invention is to provide a method for transmitting binary data wherein the bit times are variable.

Yet another object of the present invention is to provide a binary data transmission method wherein the transmitted data stream may be interpreted to provide its own clocking signals.

Another object of the present invention is to provide a modified frequency shift keying method for transmitting binary data useful upon telephone lines which impose a frequency translation upon the signal transmitted thereon. How these and other objects of the present invention are accomplished will become more apparent from the detailed description thereof taken with the accompanying drawing.

DESCRIPTION OF THE DRAWING

FIGS. 7A and 7B, taken together at the indicated match lines, comprise a second part of the electrical circuit diagram for the distributed processing modem and the field phoneline modem;

FIG. 8 is a graphical representation of a pulsed test signal usable in conjunction with the circuit diagrams of FIGS. 6A, 6B, 7A and 7B, and;

FIG. 9 is a graphical representation of the output of a comparator, the input of which is the signal represented by FIG. 8.

DESCRIPTION OF THE PREFERRED METHODS

Figure 1:
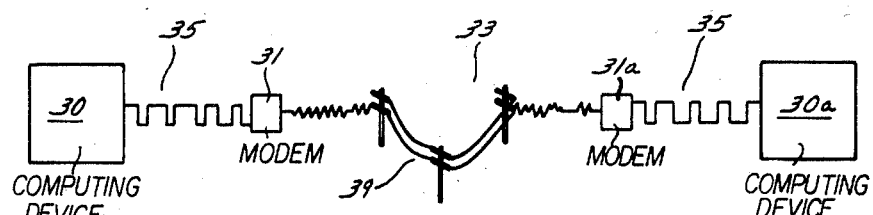
FIG. 1 is a simplified pictorial diagram illustrating a pair of computing devices coupled for electronic communication therebetween by an intermediate telephone network and a pair of modems, the latter for carrying out the methods of the present invention.

Understanding of the apparatus and network system in which the inventive methods may be used will be aided by reference to FIG. 1 which illustrates a pair of computing devices 30, 30a coupled one to the other by modulator/demodulators 31, 31a (modems) and an intermediate telephone network 33. The computing devices 30, 30a are adapted to generate and receive the digitally coded signals 35 which are converted by the modems 31, 31a into analog signals 37 and transmitted upon the telephone network 33. It should be appreciated that the telephone network 33 may include, in addition to wire conductors 39 as shown, a microwave link. If a form of frequency shift keying (FSK) is employed, as with the inventive method, signals at first and second discrete, untranslated frequencies are generated by either of the computing devices 30, 30a to denote, respectively, data signals at a first logic state "1" and a second logic state "0". In the preferred method, the first frequency is selected to be 1200 Hz and the second frequency 1763 Hz and will result in an average communication rate of about 1500 baud which is approximately the maximum communication rate attainable, consistent with the restraints imposed by telephone lines meeting Bell System 3002 specification for unconditioned lines and employing L-carrier microwave links. The modems 31, 31a have selected therewithin by appropriate programming a first bit count and a second bit count which represent, respectively, the first frequency and the second frequency.

One factor to be recognized by the system designer is that the telephone network 33 will impose an undesirable frequency shift or translation upon the transmitted signals. As an example and referring to FIG. 2, the first axis 41 has imposed thereupon a trace representing a transmitted signal 43 generated by device 30 through modem 31 and having components 45 at a first untranslated frequency to denote a data signal at a first logic state and other components 47 at a second untranslated frequency which denote data signals at a second logic state. In the preferred embodiment, the first untranslated frequency is at 1200 Hz while the second untranslated frequency is at 1763 Hz. However, the received signal 49 as detected by the modem 31a and the computing device 30a will have had a frequency translation imposed thereon as generally represented by the trace imposed upon the second axis 51 of FIG. 2. More specifically, the signal 49 will include components 53 at a first translated frequency and other components 55 at a second translated frequency. Further, the effect of this translation is cumulative and unless certain steps are taken, a bit clock time interval having a predetermined width will quickly become meaningless for data interpretation purposes.

Figure 3:
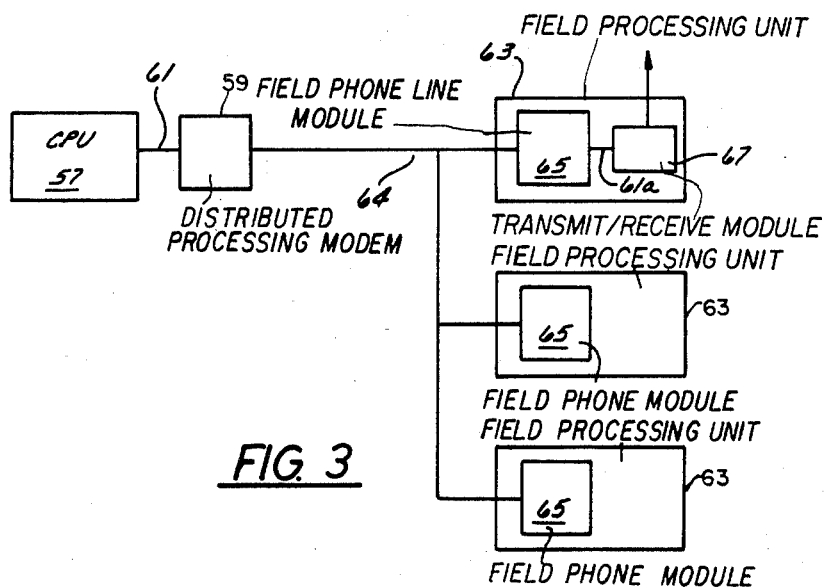
FIG. 3 is a depiction, in block diagram form, of a portion of a building automation system adapted to carry out the methods of the invention.

Referring next to FIG. 3, there is shown, in block diagram form, a portion of a building automation system for effecting heating, ventilating, air conditioning and energy management control functions and adapted to carry out the method of the invention. A central processing unit (CPU) 57 is arranged to communicate with a distributed processing modem (DPM) 59 by a communication link 61 which typically employs a proprietary communication protocol. The CPU 57 and DPU 59 are usually disposed within a central console room of, for example, a large building or office complex. An example of a CPU 57 useful in such an installation is the equipment series identified by the trademark JC/85 of Johnson Controls, Inc., Milwaukee, Wis. Distributed throughout the building are field processing units (FPU) 63 coupled to the DPM 59 by a line 64, each FPU 63 having incorporated therewithin a field phoneline modem (FPM) 65 for receiving FSK commands generated by the CPU 57 and transmitted by the DPM 59, interpreting those commands to result in the positioning of air dampers, heater coil and chiller valves and the like and to generate a responsive signal directed back to the CPU 57 which represents the activity performed by one or more of the FPU 63 as a result of those commands. A suitable transmit/received module (TRM) 67 to be coupled to the FPM 65 by link 61a is available from Johnson Controls, Inc., of Milwaukee, Wis., under its part no. 27-2582. It is to be appreciated that the CPU 57, DPM 59, line 64 and FPM 65 shown in FIG. 3 correspond generally to device 30, modem 31, network 33 and modem 31a of FIG. 1.

Figure 4:
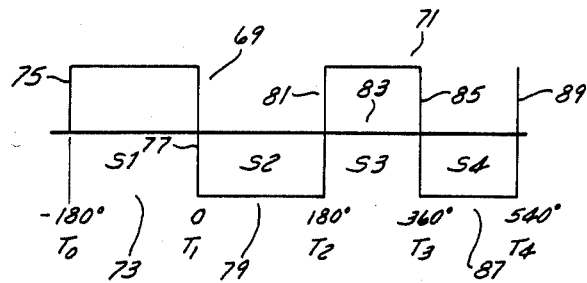
FIG. 4 is a graph representing translated, digitally coded signals as they might be received by either the distributed processing modem or the field processing modem of FIG. 3.

FIG. 4 is a graph representing digitally coded signals as they might appear on links 61, 61a to be received by either the DPM 59 or the FPM 65, the signals having a first component 69 at a first translated frequency and a second component 71 at a second translated frequency. The signals define a first interval of time 73, sample S1, having boundaries 75, 77 identifiable as T0 and T1, a second interval of time 79, sample S2, having boundaries 77, 81 identifiable as T1 and T2, a third interval of time 83, sample S3, having boundaries 81, 85 identifiable as T2 and T3 and a fourth interval of time 87, sample S4, having boundaries 85, 89 identifiable as T3 and T4. Those of ordinary skill in the art will recognize that the analog equivalents of these digital signals are as represented by the first and second full cycles imposed upon the second axis 51 of FIG. 2.

Figure 2:
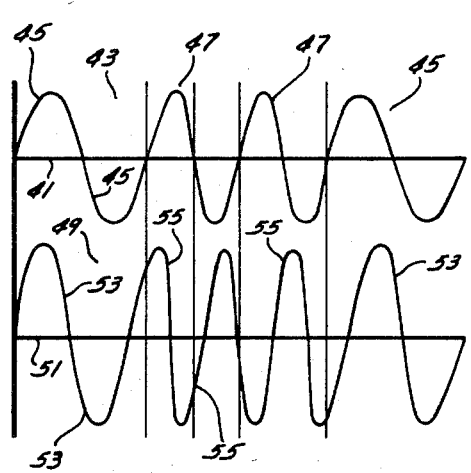
FIG. 2 comprises graphical representations of a transmitted signal having components at first and second, untranslated frequencies.
Figure 5:
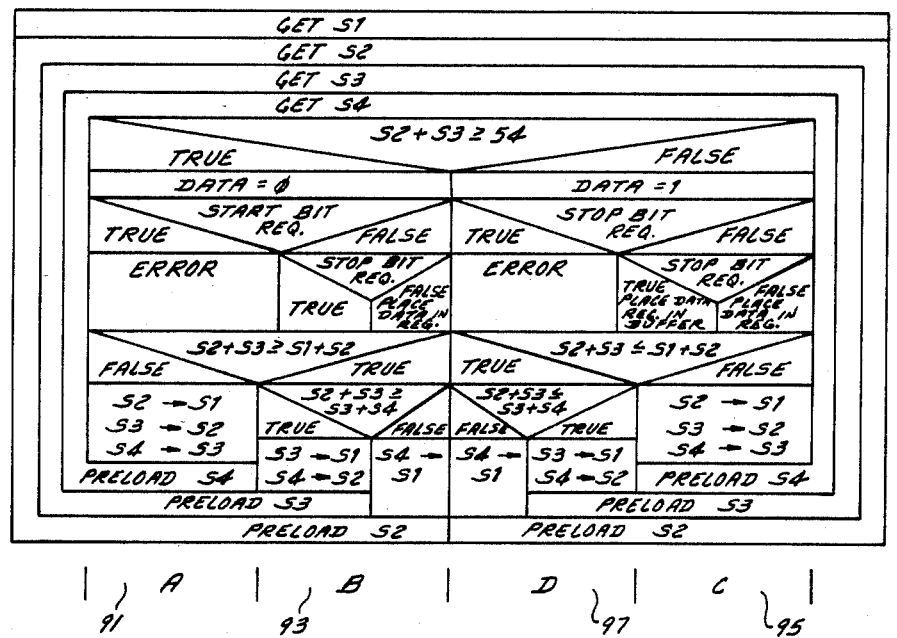
FIG. 5 is a flow chart depicting the steps for carrying out the inventive methods.

Referring additionally to that portion 91 comprising segment A of the flow chart of FIG. 5, in order to select a bit clock initiation time which will enable the accurate, continuous identification of the logic state of each received signal, a mean bit count is computed which is intermediate a first bit count representing a first untranslated frequency and a second bit count representing a second untranslated frequency. The selection of the first bit count and the second bit count is largely a matter of choice and in an exemplary selection in decimal form, a first bit count would be 64, a second bit count 44 and the mean bit count would be 54, the arithmetic average of the first and second bit counts. It will be appreciated that the first bit count, being a larger number than the second bit count, represents a longer time interval, e.g., intervals 73 or 79, than does the second bit count which represents, for example, interval 83 or 87. This is so since the time required for the occurrence of one half cycle of component 45 of FIG. 2 is greater than that required for the occurrence of one half cycle of component 47.

A base bit count is then generated which is representative of the sum S2+S3 of the second and third time intervals 79, 83 respectively. The received component is decoded as a data signal at the first logic state, logic "0" for example and as represented by first component 69, if the base bit count is equal to or greater than the mean bit count. Thereupon, a fore bit count is generated which is representative of the sum S1+S2 of the first and second time intervals 73, 79 respectively, and, similarly, an aft bit count is generated which is representative of the sum S3+S4 of the third and fourth time intervals 83, 87 respectively. As shown in segment A, the base bit count is compared with the fore bit count and the bit clock initiation time is selected as that time identifiable as T1, boundary 77, if the base bit count is equal to or less than the fore bit count. On the other hand and referring additionally to that portion 93, segment B of FIG. 5, if the base bit count is greater than the fore bit count, the base bit count is then compared with the aft bit count and the bit clock initiation time is selected to be that time identifiable as T2, boundary 81, if the base bit count is equal to or greater than the aft bit count or as that time identifiable as T3, boundary 85, if the base bit count is less than the aft bit count. Referring next to that portion 95 of FIG. 5 designated segment C, it will be apparent that if the base bit count is less than the mean bit count, the received component is to be decoded as a data signal at the second logic state, logic "1" for example as represented by the second component 71. Subsequent to the generation of the fore bit count and the aft bit count, the base bit count is then compared with the fore bit count and a bit clock initiation time is selected as that time identifiable as T1, boundary 77, if the base bit count is greater than the fore bit count. On the other hand and referring to that portion 97, segment D, if the base bit count is equal to or less than the fore bit count, the base bit count is then compared with the aft bit count. A bit clock initiation time is selected as that time identifiable as T3, boundary 85, if the base bit count is equal to or less than the aft bit count while the bit clock initiation time will be selected as that time identifiable as T2, boundary 81, if the base bit count is greater than the aft bit count.

From the foregoing, it will be apparent that a new bit clock initiation time is established for each received signal which includes components 45, 47 at both the first and the second frequencies respectively. It will be further apparent that each bit clock initiation time will be accurately determinable from a proper analysis of the received data itself rather than by a reliance upon a clocking network or other scheme which maintains in synchronism the clocks of a transmitting and receiving device. With the advent of the microprocesser, it is possible to define the time intervals using any repetitively occurring event within the signal as, for example, sequential positive peaks, sequential negative peaks, or the like. However, in the preferred method, the time intervals are defined by those instants at which the signal transcends a reference axis, nominally the zero voltage axis.

Figure 6A:
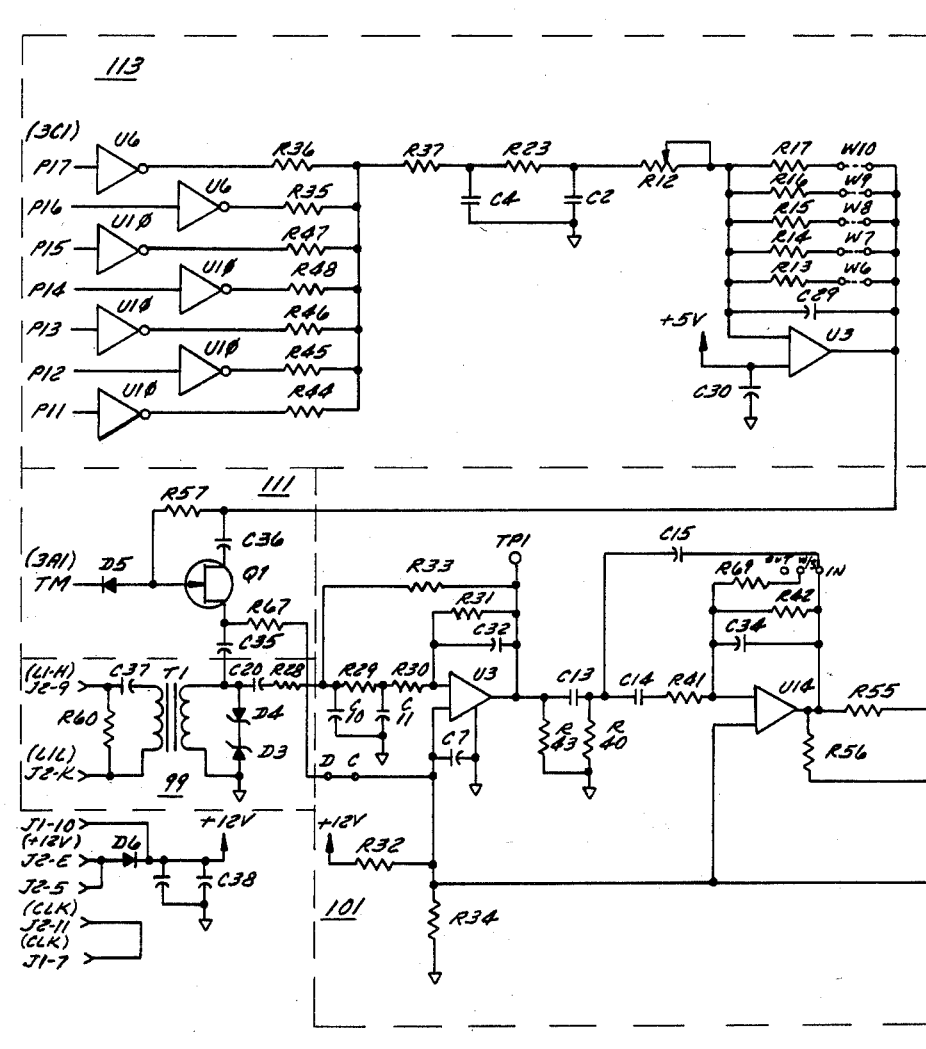
FIGS. 6A and 6B, taken together at the indicated match lines, comprise a first part of the electrical circuit diagram for the distributed processing modem and the field phoneline modem.
Figure 6B:
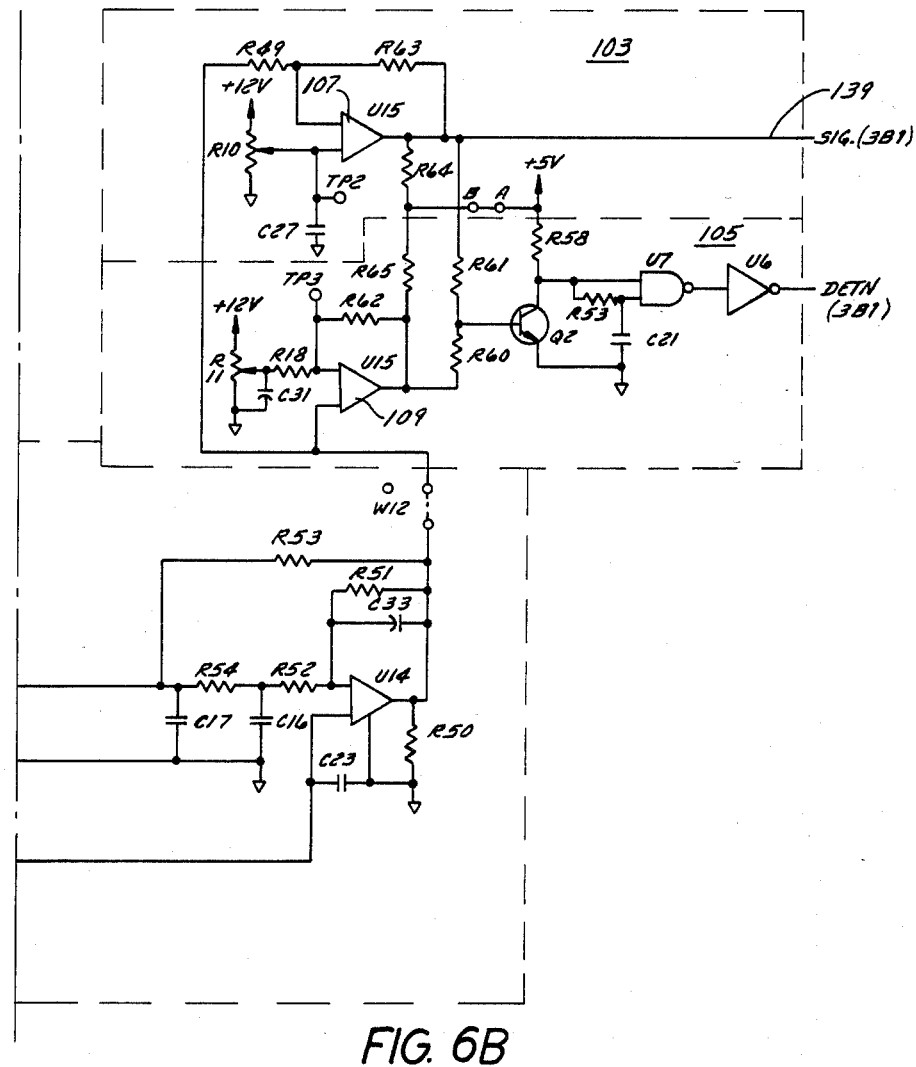

Modem apparatus 31 or 31a useful for carrying out the inventive methods is shown in FIGS. 6A, 6B, 7A and 7B. Referring first to FIGS. 6A and 6B, the DPM 59 is shown to include a combination balanced-to-unbalanced line converter and isolation transformer 99 and a band pass filter 101, the latter having 3 db power points preferably at 300 Hz and at 2700 Hz. A received signal slicer 103 and a carrier detect slicer 105 are shown, each slicer 103, 105 essentially comprising a comparator circuit. If the signal introduced thereinto is above a predetermined reference voltage, the comparators 107 or 109 will generate a high or logic "1" signal while if below the predetermined reference voltage, will generate a low or logic "0" signal. A switching circuit 107 is provided for energizing and de-energizing the transmitter while a 7 bit digital-to-analog converter 109 is provided for transforming received digital signals into analog signals.

Figure 7A:
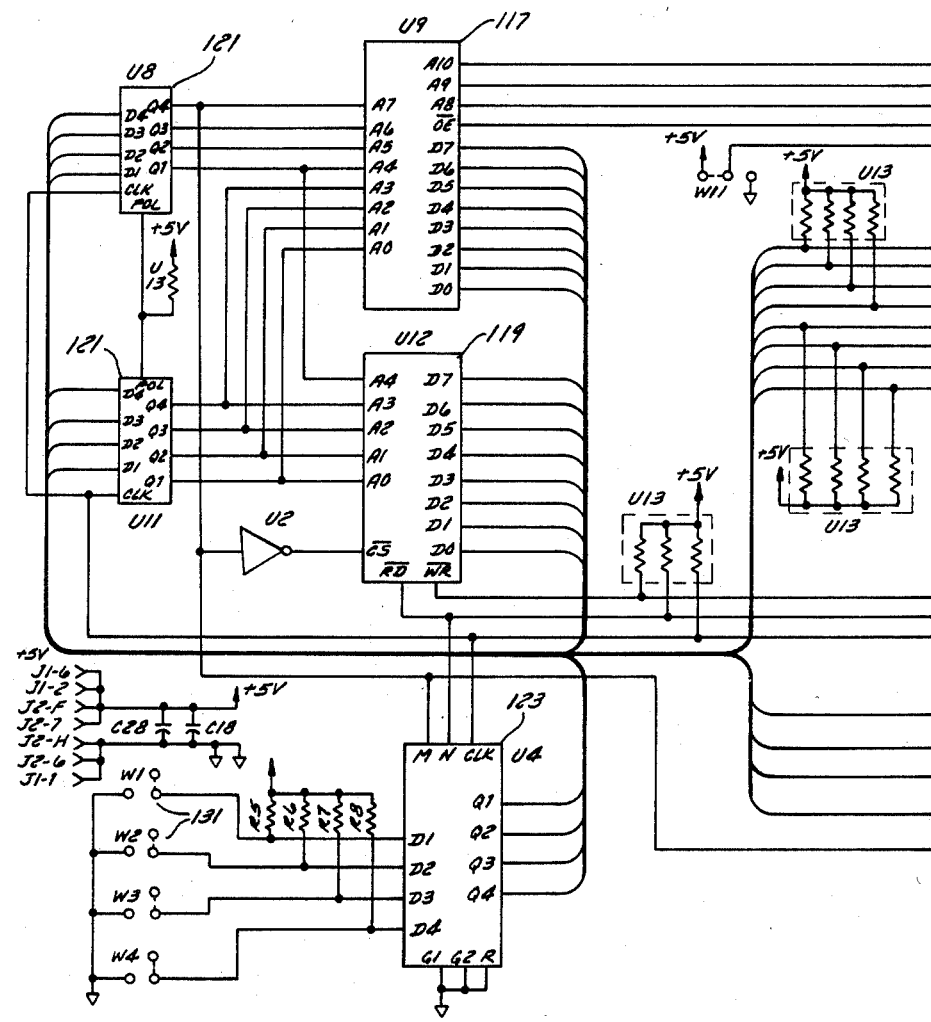

Referring next to FIGS. 7A and 7B, the pins 115 of the microprocessor 116, identified as P11–P17, are used for coupling signals to the converter 109 and an external memory capability is provided in the form of an EPROM circuit 117 and a RAM circuit 119. Address decoders 121 provide address decode functions for the EPROM 117 and the RAM 119 respectively while component 123 comprises a multiplexer chip. Component 125 is a de-multiplexer used as a latching device, the output of which is used to drive buffers 127 for switching appropriate light emitting diodes 129 which indicate the occurrences of transmit, receive, standby and error functions. For example, the diode 129 denoted as DS2 will, when illuminated, show that transmission is occurring. Jumpers 131 are provided for performing a self test function, for testing the phone lines and for selecting baud rates while a sanity circuit 133 is provided which, in the case of a failure of the microprocessor 116, will cause the latter to reset to a known state. It is to be appreciated that both the DPM 59 and the FPM 65 of FIG. 3 are each preferably constructed in accordance with FIGS. 6A, 6B, 7A and 7B.

Preferred modems 31, 31a, e.g., DPM 59 and FPM 65 used to carry out the inventive methods will incorporate provisions to aid the installer in distinguishing between a fault in the phone line and a fault in the modems 31, 31a themselves. Accordingly and referring additionally to FIGS. 8 and 9, to perform a local self test function a pulsed, generally square wave signal 135 is generated by the transmit port 137 of the microprocessor 116 and is simultaneously inserted at pins 115. In the preferred embodiment, this signal has an amplitude or vertical height as shown in FIG. 8 which is approximately one-half the maximum amplitude; that is, it has an amplitude of about 2.0 volts. This pulsed signal is preferably at a duration of about 100 microseconds and occurs approximately each 10 milliseconds when the self-test function is being utilized. The resulting output of the comparator 107, appearing at the line 139 of FIG. 6B, may be represented by the pulses 141, 141a of FIG. 9 which have several measurable time parameters associated therewith. Specifically, a first time period 143 may be measured between the initiation point of the pulse signal 135 and the initiation point of the comparator output, a second time period 145 would be equivalent to the pulse width of the first comparator output signal 141, a third time period 147 would be that occurring between the cessation of the first pulse 141 and the commencement of the second pulse 141a and a fourth time period 149 would be equivalent to the pulse width of the second comparator output signal 141a. So long as these time periods 143, 145, 147, 149 are within a predetermined range of periods, it will be known by the installer that the modems will be operable upon any telephone line which meets the aforementioned Bell system specification and that the phone line itself, rather than the modems, is likely at fault. Preferably, the first time period 143 is nominally 350 microsec., the second time period 145 is 650 microsec., the third time period 147 is 1500 microsec. and the fourth time period 149 is 900 microsec. The tolerance boundaries 151, 153, 155 and 157 respectively define respective tolerance times of 91 microsec., 312 microsec., 600 microsec., and 576 microsec. and the midpoint of each boundary 151, 153, 155, 157 is represented to be in vertical registry with their respective signal initiation or termination boundaries appearing therebelow.

A copy of the object code useful with the type 8039 microprocessor 116 for carrying out the methods disclosed herein is attached hereto as an Appendix.

The following components have been found useful in constructing the disclosed modems for carrying out the inventive method:

| FIGS. 6A, 6B | | | |
| --- | --- | --- | --- |
| U6, U10 | 40498 | U3, U14 | TL082 |
| U15 | 393 | U7 | 40118 |
| Q2 | 2N3904 | Q1 | 2N4392 |
| R36, R57 | 1.0K | R35 | 2.0K |
| R47 | 4.12K | R48 | 8.06K |
| R46 | 16.2K | R45 | 31.6K |
| R44 | 59K | R37, R23 | 38.3K |
| R12, R10, R11 | 50K | R17 | 25.5K |
| R16 | 35.7K | R15 | 49.9K |
| R14 | 73.2K | R13, R18, R69 | 100K |
| R49 | 10K | R63, R59 | 47K |
| R64, R65 | 3.9K | R58, R60, R61 | 22K |
| R62 | 750K | R67 | 2.37K |
| R29,R30,R43,R40,R34 | 3.01K | R31, R51 | 127K |
| R33, R53 | 13.7K | R28 | 1.62K |
| R68 | 1.21K | R41 | 2.21K |
| R42 | 267K | R55 | 412 |
| R56 | 20.0K | R50,R52,R54,R32 | 3.01K |
| C2, C4 | 0.001mf | C29 | 150pf |
| C30, C27, C31 | 0.1mf | C21, C14 | 0.01mf |
| C36, C7, C25 | 15mf | C35, C37 | 2.2mf |
| C20 | 0.33 mf | C10, C11, C13 | 0.047mf |
| C32, C34, C33 | 100pf | C17, C16 | 0.047mf |

| -continued | | | |
| --- | --- | --- | --- |
| C38, C23 | 0.1mf | D5 | 1N4448 |
| D3, D4 | 1N753A | D6 | 1N4001 |
| C15 | 0.022mf | | |
| FIGS. 7A, 7B | | | |
| U8, U11 | 4042B | U9 | 2716 |
| U12 | 1824 | U6, U10, U2 | 4049B |
| U7 | 4011B | U4, U1 | 4076B |
| U13, R9 | 10K | R19,R20,R21,R22 | 1M |
| R38 | 1K | R24 | 3.3M |
| R39 | 270K | R25 | 22K |
| R5, R6, R7, R8 | 10K | R1, R2, R3, R4 | 470 |
| D51, D52, D53, D54 | Red LED | C8, C9 | 20pf |
| Y1 | 5.76MHz | C5, C3 | 0.005mf |
| C1, C18 | 0.0047mf | C28 | 15mf |
| D1, D2 | 1N4448 | | |

While only a few embodiments of the preferred method have been shown and described, the invention is not intended to be limited thereby but only by the scope of the claims which follow.

We claim:

1. A method for communicating binary data using modified frequency shift keying techniques and including the steps of:
    selecting a first bit count representative of a first untranslated frequency denoting a data signal at a first logic state;
    selecting a second bit count representative of a second untranslated frequency denoting a data signal at a second logic state;
    computing a means bit count intermediate said first bit count and said second bit count;
    detecting a signal having a first component at a first translated frequency and a second component at a second translated frequency and defining a first interval of time having boundaries identifiable as T0 and T1, a second interval of time having boundaries identifiable as T1 and T2, a third interval of time having boundaries identifable as T2 and T3 and a fourth interval of time having boundaries identifiable as T3 and T4;
    generating a base bit count representative of the sum of said second and third time intervals;
    decoding said first component as a data signal at said first logic state if said base bit count is equal to or greater than said mean bit count;
    decoding said first component as a data signal at said second logic state if said base bit count is less than said mean bit count;
    generating a fore bit count representative of the sum of said first and second time intervals;
    generating an aft bit count representative of the sum of said third and fourth time intervals;
    comparing said base bit count with said fore bit count;
    selecting a bit clock initiation time as that time identifiable as T1 if said base bit count is equal to or less than said fore bit count;
    comparing said base bit count with said aft bit count if said base bit count is greater than said fore bit count, and;
    selecting said bit clock initiation time as that time identifiable as T2 if said base bit count is equal to or greater than said aft bit count.

2. The method set forth in claim 1 wherein said time intervals are defined by said signal transcending a reference axis.

* * * * *